3,055,877
POLYMERIZATION OF ACRYLONITRILE
Thomas C. Singleton, Texas City, Tex., assignor to Monsanto Chemical Company, St. Louis, Mo., a corporation of Delaware
No Drawing. Filed Mar. 9, 1960, Ser. No. 13,723
3 Claims. (Cl. 260—88.7)

The present invention relates to polymerization of acrylonitrile and, more particularly, to new catalysts or initiators for the polymerization of acrylonitrile.

Polymerization of ethylenically unsaturated compounds is a process of great technical importance. Polymers of acrylonitrile, for example, as well as its copolymers with other polymerizable organic compounds containing an ethylenic double bond are well known and in great demand. Polyacrylonitrile, in particular, has achieved wide use in the production of many valuable commercial products mainly and most recently in the field of synthetic fibers. While polymerization of acrylonitrile may be effected thermally without a catalyst, one is generally employed. Compounds containing directly linked oxygen or nitrogen atoms such as benzoyl peroxide, potassium persulfate, or $\alpha,\alpha'$ azodiisobutyronitrile which generate free radicals are conventionally employed. While these are generally satisfactory, some difficulties have been encountered in their use and new catalysts are constantly being sought for the polymerization process. Accordingly, it is an object of the present invention to provide a new catalyst or initiator for the polymerization of acrylonitrile. Other objects and advantages of the invention will become apparent from the following description thereof.

According to the invention, acrylonitrile is polymerized by bringing the monomer into contact under acidic conditions with p-aminophenol. This is indeed a surprising phenomenon in view of the fact that p-aminophenol is generally recognized as an inhibitor of polymerization of monomers such as acrylonitrile. That it does not so function under acidic conditions but has the opposite effect of initiating the polymerization is totally unexpected.

The following example in which parts are by weight is illustrative of the invention.

Example 1

A 300-ml. three-necked, round-bottomed flask was employed as the polymerization vessel. This was fitted with a mechanical stirrer and the necessary tubing and adapters for purging with an inert gas. The reactor flask was immersed in a thermostatically controlled oil bath which was protected from reflected light by means of heavy paper wrapping.

After the reactor was thoroughly purged with inert gas, acrylonitrile (100 ml.) which has been outgassed for from 20–30 min. with nitrogen and contained a known minor amount of para-aminophenol was charged to it. Concentrated hydrochloric acid was then added followed by a small amount of water. The mixture was stirred rapidly for a few minutes to effect homogeneous solution which was facilitated by the presence of the water. The clear solution was then stirred gently while it was maintained at a temperature of about 60° C. The flask was examined at regular intervals with the aid of a flashlight to detect turbidity caused by the formation of polymer and to determine the induction time for the polymerization. The induction period was designated as the time interval from the mixing of the reactants until polymer was observed in the flask. The conditions and results of several polymerization runs conducted in this manner are presented below. Control runs in which no catalyst or initiator was employed, in which p-aminophenol was tested with no acid present, and in which acid alone was present during the polymerization are included for comparative purposes.

| Run No. | Water Added (Ml.) | Conc. HCl Added (Mol) | p-Aminophenol Added (Mol) | Induction Period (Min) |
|---|---|---|---|---|
| 1 | 0 | 0 | 0 | >960 |
| 2 | 1.0 | 0 | 0 | >960 |
| 3 | 0 | $3\times10^{-5}$ | 0 | >960 |
| 4 | 1.0 | $3\times10^{-5}$ | 0 | >960 |
| 5 | 0 | 0 | $7.5\times10^{-5}$ | >960 |
| 6 | 1.0 | 0 | $7.5\times10^{-5}$ | >960 |
| 7 | 0 | $3\times10^{-5}$ | $7.5\times10^{-5}$ | 10–15 |
| 8 | 1.0 | $3\times10^{-5}$ | $7.5\times10^{-5}$ | 10–15 |
| 9 | 1.0 | $3\times10^{-5}$ | $7.5\times10^{-5}$ | <5 |
| 10 | 2.0 | $1.5\times10^{-4}$ | $7.5\times10^{-5}$ | 15–30 |

It is evident from the foregoing tabulated data that minor amounts of p-aminophenol under acidic conditions are effective for initiating the polymerization of acrylonitrile while p-aminophenol in a non-acidic medium will not bring about ploymerization within any comparable period of time and an acid alone has no apparent effect on the polymerization of this nitrile.

The invention is not to be considered as limited to the precise conditions set forth in the example. While the preferred temperature for polymerization lies within the range from about 50° C. to about 75° C., for instance, the polymerization may be carried out at any temperature within the range from about 0° C. to about 100° C. At the lower temperatures, the rate of polymerization is generally slow. The higher temperatures are used particularly when the time of polymerization is to be kept at a minimum, for example, in a continuous process.

The p-aminophenol used for initiation can be present in amounts ranging from as little as 0.01% to as much as 5%. Preferably, however, amounts in the range from about 0.01% to about 1.0% are employed.

Acids other than hydrochloric such as sulfuric, phosphoric, acetic and the like can be employed for acidifying the acrylonitrile monomer. The amount of acid employed is not critical and only minor amounts sufficient to maintain the mixture on the acid side of neutral are required. Generally, these lie in the range from about 0.001% to about 1% by weight of the acrylonitrile being polymerized.

What is claimed is:

1. A process for the polymerization of acrylonitrile wherein acrylonitrile is brought into contact under acidic conditions with para-aminophenol in an amount sufficient to initiate the polymerization of said acrylonitrile.

2. The process of claim 1 wherein said polymerization is effected at a temperature from about 0° C. to about 100° C.

3. The process of claim 2 wherein said para-aminophenol is present in an amount within the range from about 0.01% to about 5% by weight of said acrylonitrile.

No references cited.